Aug. 9, 1938.   J. W. SESSUMS   2,126,221
AIRCRAFT PROPELLER UNIT
Filed Nov. 25, 1936
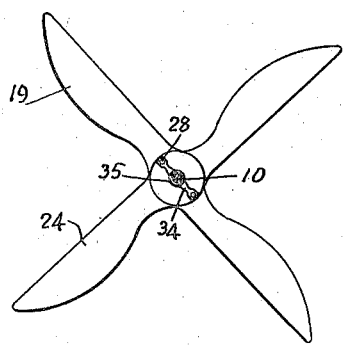
Fig.1.
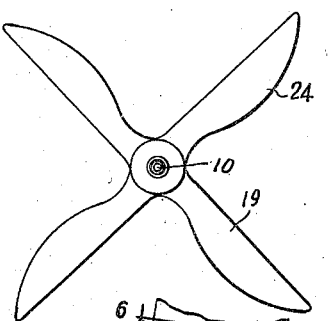
Fig.2.
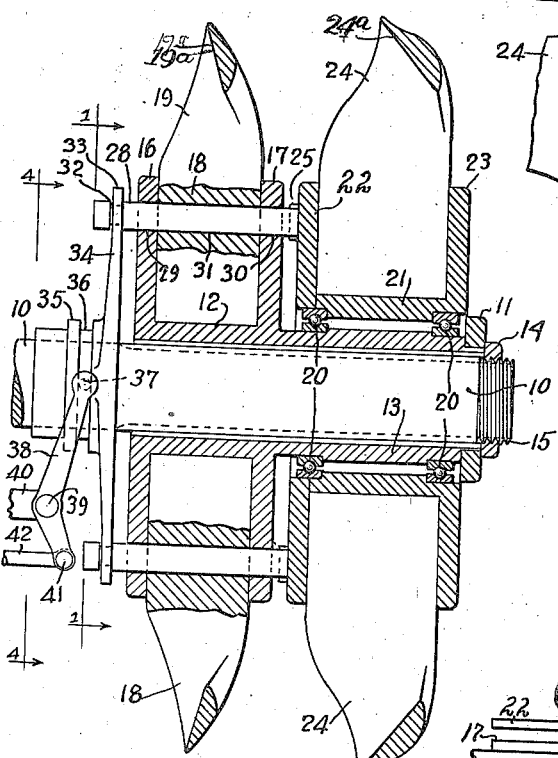
Fig.3.
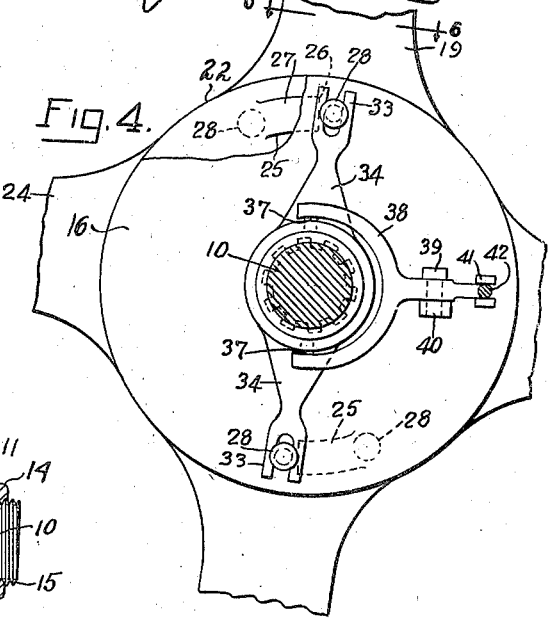
Fig.4.
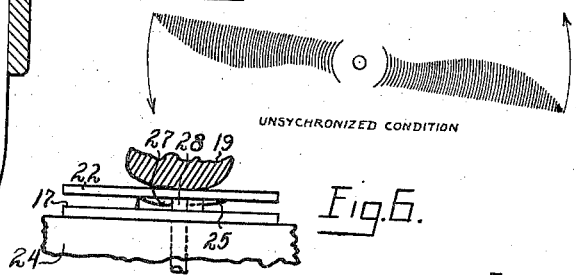
Fig.5.
Fig.6.
JOHN W. SESSUMS, Inventor
By Toulmin & Toulmin
Attorneys Patented Aug. 9, 1938

2,126,221

UNITED STATES PATENT OFFICE 2,126,221

AIRCRAFT PROPELLER UNIT

John W. Sessums, Fairfield, Ohio

Application November 25, 1936, Serial No. 112,669

3 Claims. (Cl. 170—165)

This invention relates to aircraft propelling devices, and in particular, to aircraft propeller units for producing different propelling effects from the same unit.

One object of this invention is to provide an aircraft propeller unit having a plurality of propellers capable of being driven individually or collectively.

Another object is to provide an aircraft propeller unit having a plurality of propellers of different pitch, these propellers being adapted to be driven singly or in unison.

Another object is to provide an aircraft propeller unit having a pair of propellers, one of which is arranged to be driven and the other arranged to be selectively driven or allowed to rotate freely, these propellers being of different pitch but substantially coaxial.

Another object is to provide an aircraft propeller unit having a pair of propellers mounted for rotation upon a substantially common axis, the forward propeller having a pitch which is higher than that of the rearward propeller, means being provided for forcibly rotating either or both of the propellers or for allowing one of the propellers to rotate freely.

Another object is to provide an aircraft propeller unit, as described in the paragraph immediately above, wherein the forward propeller is given a pitch which is substantially higher in a sufficient degree to substantially counterbalance the inherent loss of efficiency of the rearward propeller due to its slippage in the air, means being provided for allowing the forward propeller to rotate freely or for driving it from a source of power so that one propeller may be employed in taking off and climbing, whereas the other propeller may be used in level flying, thereby adapting the propelling unit to the most efficient operation of the aircraft under these differing conditions.

Another object is to provide an aircraft propeller unit consisting of a pair of propellers of different but fixed pitch, at least one of which is capable of being selectively allowed to rotate freely or be driven by a power source, the leading propeller being arranged to have a pitch sufficiently great to overcome the inherent loss of efficiency of the following propeller so that when the leading propeller is power-driven the following propeller will merely rotate in the air without substantial slippage and without absorbing a substantial amount of power from the power source, and giving an effect analogous to entirely removing the following propeller from the aircraft.

Another object is to provide a method of determining the proper time to drivingly interconnect a pair of propellers by observing the appearance and disappearance of the shadow seen when the propellers are out of synchronism, i. e., rotating at different speeds.

In the drawing:

Figure 1 is a vertical cross section along the line 1—1 in Figure 3, but with the propeller blades at right angles.

Figure 2 is a left-hand end elevation of the aircraft propeller unit shown in Figure 3, but with the propeller blades at right angles.

Figure 3 is a side elevation, partly in longitudinal section, through the aircraft propeller unit shown in Figures 1 and 2, with the propellers rotated to bring them into substantial alignment for clearness of showing.

Figure 4 is a section along the line 4—4 in Figure 3, showing the propeller driving connections, a portion being broken away to disclose more clearly the mechanism behind the portion broken away.

Figure 5 is a diagrammatic view showing the appearance of the propeller unit in operation when the two propellers are unsynchronized, i. e., rotating at different speeds.

Figure 6 is a fragmentary plan view of a portion of Figure 4, showing a part of the connecting and disconnecting mechanism for the forward propeller.

In general, the aircraft propeller unit of this invention consists of a shaft having a pair of propellers mounted thereon, at least one of these propellers being selectively adapted to rotate freely and loosely upon the shaft, means being provided to drivingly connect this freely rotatable propeller to the shaft at the will of the pilot. The forward propeller of the pair is of higher or greater pitch than the rearward propeller, the pitch being greater in a sufficient degree to counterbalance the inherent loss of efficiency of the rearward propeller. Under these circumstances when both propellers are power-driven the propeller of lower pitch is operating at approximately its theoretical efficiency so that it consumes very little power, and has substantially no propulsion effect upon the aircraft. When the forward propeller is freely rotatable and the rearward propeller of lower pitch is driven, a different propulsion effect is given to the aircraft.

Hitherto, one of the serious problems connected with the propulsion of aircraft has been the difficulty of providing an aircraft propeller which will be efficient during the take-off and climbing periods of the aircraft as well as in level flying, and which will utilize the engine efficiently under all circumstances. Variable pitch propellers have been devised for this purpose, but the mechanism thereof is very heavy and the cost very high. Such variable pitch propellers, therefore, are not suited for application to light-weight airplanes not only because the cost is prohibitive, but also because the great weight of such a propeller mechanism so reduces the load-carrying capacity of the aircraft that the advantage gained by the variable pitch propeller is outweighed by the disadvantage of reduced carrying capacity. Airplanes are subject to governmental regulations which prescribe limits of loads which can be carried. Obviously, if a heavy variable pitch propeller mechanism is added, this mechanism adds so much weight to the airplane and consequently subtracts so much weight from the useful load-carrying rating, that for extremely light planes an extra passenger can no longer be carried without violating the governmental rating.

Furthermore, the crankshafts of aircraft engines are ordinarily engineered for one resonance period, such as would be given by a propeller of one design. Where variable pitch propeller units are mounted upon crankshafts, these change the resonance periods of such crankshafts from the periods for which they were designed, with the result that breakage is liable to result from the consequent vibration. The present invention, however, eliminates the heavy variable pitch propeller mechanism, and instead employs a simple mechanism utilizing a pair of propellers of different pitch, preferably in such relationship that the greater pitch of the front propeller substantially overcomes the inherent loss of efficiency of the rear propeller with mechanism arranged so that one propeller may be utilized for take-off and climbing purposes and the other propeller for level flying.

Referring to the drawing in detail, Figures 1 and 3 show the propeller unit of this invention as consisting of a shaft 10 having splined portions 11, upon which are mounted the main propeller hub 12 having a forwardly extending portion 13. A nut 14, mounted upon the threaded portion 15, secures the main propeller hub 12 firmly in place upon the shaft 10. The propeller hub 12 is provided with flanges 16 and 17, adapted to receive the central portion 18 of a propeller 19. The forwardly extending portion 13 of the hub 12 is provided with anti-friction bearings 20 adapted to support the auxiliary hub 21 rotatably thereon. The auxiliary hub 21 is provided with flanges 22 and 23, adapted to receive the central portion of a propeller 24. The flange 22 is provided with suitable devices 25, adapted to serve for drivingly connecting the hub 21 to the hub 12 so that the freely rotatable propeller 24 may be driven from the shaft 10 at the will of the pilot. The devices 25 are shown as consisting of wedge-like projections (Figure 4) extending outwardly from the flanges 22 and having substantially perpendicular edges 26 and inclined back portions 27. The projections 25 are adapted to be selectively engaged by the axially movable pins 28 passing through holes 29, 30 and 31 in the flanges 16 and 17 and the propeller 19, respectively. The outer ends of the pins 28 are provided with annular grooves 32, arranged to receive the bifurcated ends 33 of radial arms 34, the central portions of which terminate in a sleeve 35 having an annular groove 36. The sleeve 35 is slidably mounted upon the shaft 10 and for this purpose is engaged by the pins 37 of a yoke lever 38, which is pivoted as at 39 upon the member 40. Pivotally attached, as at 41, to the yoke lever 38 is an operating rod 42, the reciprocation of which is adapted to move the sleeve 35, the arms 34 and the pins 28 in an axial direction relatively to the shaft 10, thereby moving the ends of the pins 28 selectively into and out of engagement with the projections or stops 25. The shaft 10 is operatively connected to a prime mover, such as an engine, (not shown).

The forward propeller 24 is preferably of greater pitch than the rearward propeller 19, as shown at 24a and 19a, respectively, in Figure 3, this difference of pitch being preferably in such degree that the excess pitch of the forward propeller 24 substantially counteracts the inherent loss of efficiency of the rearward propeller 19. The cross-hatched portions 24a and 19a indicate the respective cross sections of the propeller blades, which are thus cut away to show their different degrees of pitch. The inherent loss of efficiency due to the slippage between a propeller and the air in which it operates is of the order of fifteen to twenty per cent. According to the present invention, the forward propeller is therefore provided with a pitch fifteen to twenty per cent. greater than the pitch of the rearward propeller so that when the two propellers are drivingly connected to a common source of power, the forward propeller of greater pitch will be rotating for propelling the aircraft, and the rearward propeller of lower pitch will be operating at approximately its theoretical efficiency, thus drawing substantially no power, producing substantially no slippage relatively to the air, and by analogy, screwing its way through the air in a manner comparable with that of a screw operating in a solid medium like a wood screw forcing its way into a piece of wood.

The propeller unit of the present invention improves the take-off and climbing characteristics of the aircraft and enables an aircraft engine to be used in the most efficient manner. This has hitherto been accomplishable only by the use of cumbersome and bulky pitch-control mechanism, which is prohibitive at least for light aircraft, on account of its weight and expense. Assume for purposes of an example, that an aircraft engine rotates at 1,750 R. P. M. under cruising conditions, with the possibility of turning over at 1,900 R. P. M., with the engine wide open. Under take-off conditions, however, using the single propeller of fixed pitch, the engine would probably be incapable of rotating the propeller much more than 1,400 R. P. M., due to the lack of wind coming into the propeller and to the slow climbing speed. By employing a low pitch propeller for take-off conditions, however, the engine speed can be increased so that it will operate more nearly at its most efficient speed. By employing a propeller of greater pitch for level flying, however, the same engine speed can still be utilized, whereas a propeller of lower pitch, under such conditions, would reduce the speed of the aircraft to an inefficient amount. On level flying, the wind coming into the propeller and the higher speed of the aircraft than in climbing, enable the engine to utilize a propeller of greater pitch and still attain its rated number of revolutions per minute.

In the operation of the aircraft propeller unit of the present invention, the engine is started with the front propeller 24 disengaged, the pins 28 being therefore to the left of the position shown in Figure 3. The ends of these pins 28 are therefore withdrawn from engagement with the projections 25. The rearward propeller 29 is therefore rotated by the power of the engine, and the forward propeller 24 merely "windmills"; that is, rotates freely upon its anti-friction bearings 20. The pilot then speeds up his engine for the take-off and climb, employing the rearward propeller 19 of lower pitch. Due to this lower pitch, however, the engine is enabled to approach its rated speed in revolutions per minute during the take-off and climb. When the aircraft reaches the desired height for level flying, the pilot retards the throttle so that the engine and the rear propeller 19 rotate more slowly. Meanwhile, the forward propeller 24 has been rotating freely, and its speed now tends to exceed the speed of the rearward propeller 19 due to the retardation effect of the engine.

When the two propellers 19 and 24 are rotating at different speeds, the pilot sees a rotating shadow in the propeller zone. This shadow rotates in one direction or the other, depending upon which of the propellers is rotating more rapidly. The pilot observes the rotation of this shadow and retards the throttle of his engine, thereby reducing the speed of the rearward propeller 19 until this shadow momentarily disappears. With the disappearance of the shadow the pilot knows that the two propellers 24 and 19 are rotating in synchronism at substantially the same speed. The front propeller 24 is therefore in a condition for being coupled to the engine for propelling the aircraft. The pilot acordingly shifts the rod 42, causing the sleeve 35, the arms 34 and the pins 28 to move to the right (Figure 3), causing the ends of the pins 28 to move into engagement with the projections 25. If the pins move into spaces remote from the projections 25 the front hub 21 will merely rotate until the projections 25 come around to the ends of the pins 28. If the front hub 21 and the front propeller 24 are rotating more rapidly than the rear propeller 19 and its hub 12, the inclined surface 27 of the projections 25 will cause the ends of the pins 28 merely to slip over the projections 25 until the speed reaches a suitable amount. With the front propeller thus coupled to the engine, the pilot opens the throttle and speeds up the engine, whereupon the ends of the pins 28 engage the perpendicular ends 26 of the projections 25, positively driving the front propeller 24.

As the front propeller is of greater pitch, its actual efficiency of approximately eighty per cent. absorbs the theoretical or one hundred per cent. efficiency of the rearward propeller, thereby causing the rearward propeller to rotate substantially without any expenditure of power. Under these conditions, the rearward propeller has the same effect as if it were entirely absent because it literally screws its way through the air without relative slippage and as if the air consisted of a solid medium. Thus, in effect, the pilot removes the rearward propeller 19 of lower pitch from the aircraft and substitutes the forward propeller 24 of higher pitch for level flying. The greater capability of the engine for rotating at higher speeds under level flying conditions is thus made use of by employing the propeller of greater pitch and dispensing with the propeller 19 of lower pitch.

The shadow test by which the pilot determines when the two propellers are in proper condition for coupling the free propeller to the driving shaft affords a simple yet accurate means for determining this question. The aircraft propeller unit of this invention dispenses with the heavy weight, great bulk and mechanical complexity of the variable pitch propeller devices of the prior art, and provides a simple, lightweight mechanism which can be manufactured at low cost. Accordingly, this propeller unit is especially valuable for use on light-weight aircraft where variable pitch propeller units would be prohibitive for the reasons previously mentioned. The provision of the forward propeller of greater pitch for absorbing the effect of the rearward propeller of lower pitch, by having the forward propeller pitch substantially counteracting the inherent loss of efficiency of the rearward propeller, gives the effect of replacing one propeller by another for the different conditions of take-off, climbing and level flying.

In this manner the inefficiency and inadaptability of a fixed pitch propeller at operating speeds other than those for which it is designed are completely overcome. No dragging effect results from the screw propeller of lesser pitch as long as the screw propeller of greater pitch does not have an actual pitch greater than the theoretical pitch of the screw propeller of lesser pitch, usually a difference of about twenty per cent. No interference of substantial consequence results from the action of the screw propeller of greater pitch when it is not in use, because it is then free to rotate upon its anti-friction bearings 20. When this is done the screw propeller of lesser pitch is doing little or no work, so that the mechanical advantage of high revolutions per minute of the power shaft is utilized by disengaging the screw propeller of greater pitch and using only the screw propeller of lesser pitch.

It will be understood that I desire to comprehend within my invention such modifications as come within the scope of the claims and the invention.

Having thus fully described my invention, what I claim as new and desire to secure by Letters Patent, is:

1. In an aircraft propeller unit, power-driven means, a plurality of propellers, means for operatively connecting one of said propellers to said power-driven means, and means for selectively connecting and disconnecting the other of said propellers relatively to said power-driven means for power-driven or relatively free rotation respectively, one of said propellers having associated therewith a plurality of arcuate projections with inclined portions and the other of said propellers having an element movable into engagement with said projections.

2. A method of synchronously coupling a pair of propellers, one of which is selectively freely rotatable or drivingly connected to the power source at the will of the operator, comprising retarding the speed of rotation of one of said propellers while observing the rotating shadow seen in the propeller zone, and drivingly connecting the freely rotatable propeller to the power source substantially at the instant the rotating shadow disappears.

3. A method of propelling an aircraft having a pair of propellers, one of which is connected to the engine and the other of which is selectively freely rotatable or drivingly connectible to the engine at the will of the operator, comprising retarding the speed of the engine to retard the speed of the propeller connected thereto while observing the rotating shadow seen in the propeller zone, and drivingly connecting the freely rotatable propeller to the engine responsive to the substantial disappearance of the rotating shadow from the propeller zone.

JOHN W. SESSUMS.